United States Patent [19]

Hardman

[11] Patent Number: 4,756,459
[45] Date of Patent: Jul. 12, 1988

[54] ATTACHMENT FOR VEHICLE ARM REST

[76] Inventor: William R. Hardman, 2620 S. 123rd, Seattle, Wash. 98168

[21] Appl. No.: 87,736

[22] Filed: Aug. 21, 1987

[51] Int. Cl.$^4$ .............................................. B60R 7/00
[52] U.S. Cl. ................................... 224/275; 206/387; 296/37.1; 296/37.8; 296/37.15; 224/273; 224/42.42
[58] Field of Search ............ 224/273, 275, 277, 42.42; 296/37.1, 37.8, 37.15; 206/387; 108/44; 280/727; 220/22; 312/10, 215, 330, 333, 350

[56] References Cited

U.S. PATENT DOCUMENTS

| | | | |
|---|---|---|---|
| D. 212,403 | 10/1968 | DiVona et al. | 206/387 X |
| 2,692,638 | 10/1954 | Castell | 108/44 X |
| 3,118,704 | 1/1964 | Meserve | 224/275 X |
| 3,136,461 | 6/1964 | Gregg, Jr. | 224/42.42 |
| 3,632,158 | 1/1972 | Boothe | 296/37.8 |
| 3,873,010 | 3/1975 | Patterson | 224/275 |
| 3,893,585 | 7/1973 | Morrison et al. | 206/387 X |
| 4,106,829 | 8/1978 | Dolle et al. | 224/275 X |
| 4,146,159 | 3/1979 | Hemmen | 224/275 |
| 4,300,709 | 11/1981 | Page, Jr. | 224/275 |
| 4,423,812 | 1/1984 | Sato | 296/37.8 X |
| 4,512,503 | 4/1985 | Gioso | 224/275 X |
| 4,678,081 | 7/1987 | Richter | 206/387 |
| 4,685,729 | 8/1987 | Heesch et al. | 296/37.15 X |

FOREIGN PATENT DOCUMENTS

| | | | |
|---|---|---|---|
| 344416 | 7/1978 | Austria | 206/387 |
| 2536854 | 3/1977 | Fed. Rep. of Germany | 296/37.8 |
| 3136755 | 3/1983 | Fed. Rep. of Germany | 206/387 |
| 3246041 | 6/1984 | Fed. Rep. of Germany | 206/387 |
| 1030750 | 6/1955 | France | 296/37.15 |
| 1417075 | 9/1965 | France | 224/42.42 |
| 0043041 | 4/1981 | Japan | 224/275 |
| 0062873 | 4/1983 | Japan | 206/387 |
| 7709480 | 3/1979 | Netherlands | 206/387 |
| 2114956 | 9/1983 | United Kingdom | 206/387 |

Primary Examiner—Henry K. Artis
Assistant Examiner—Robert Petrik
Attorney, Agent, or Firm—Henderson & Sturm

[57] ABSTRACT

The invention resides in a box-like structure having provision for removable attachment thereof to the arm rest of a vehicle, typically the arm rest conventionally provided at the vehicle front seat. The structure has an open front end via which a drawer may be moved between opened and closed position relative to the box. The drawer is adapted to contain tape casettes, discs, etc. The mounting structure is sleeve-like and is adapted to slip rearwardly over the arm rest, having also straps for securing the box in place.

7 Claims, 2 Drawing Sheets

ATTACHMENT FOR VEHICLE ARM REST

BACKGROUND AND SUMMARY OF THE INVENTION

It is known of course to provide boxes and the like for use in carrying various articles on the front seats of automobiles. Some of these boxes are portable and some are affixed to the seat. According to the present invention, an attachment is provided for mounting atop the usual arm rest, typically that afforded centrally of the front seat, primarily because the inventive structure is designed for carrying tape casettes, discs, etc., ordinarily associated with a dash-mounted player. It is a feature of the invention that it has a depending sleeve-like means capable of being slipped rearwardly over the front of the arm rest for temporary but snug affixation of the attachment to the arm rest. The sleeve-like structure may include elasticized side walls for firmly gripping the arm rest and, in addition, straps or the like are included to embrace the arm rest from the rear so as to prevent unwanted forward removal of the attachment from the arm rest. The attachment features a box containing a fore-and-aft slidable drawer constructed to hold casettes, discs, etc. The exterior of the attachment may be covered and padded to blend with the decor of the vehicle in which it is used.

Further features will appear as a preferred embodiment of the invention is disclosed in detail in the ensuing description and accompanying drawings.

DETAILED DESCRIPTION OF A PREFERRED EMBODIMENT OF THE INVENTION

Figure 1:
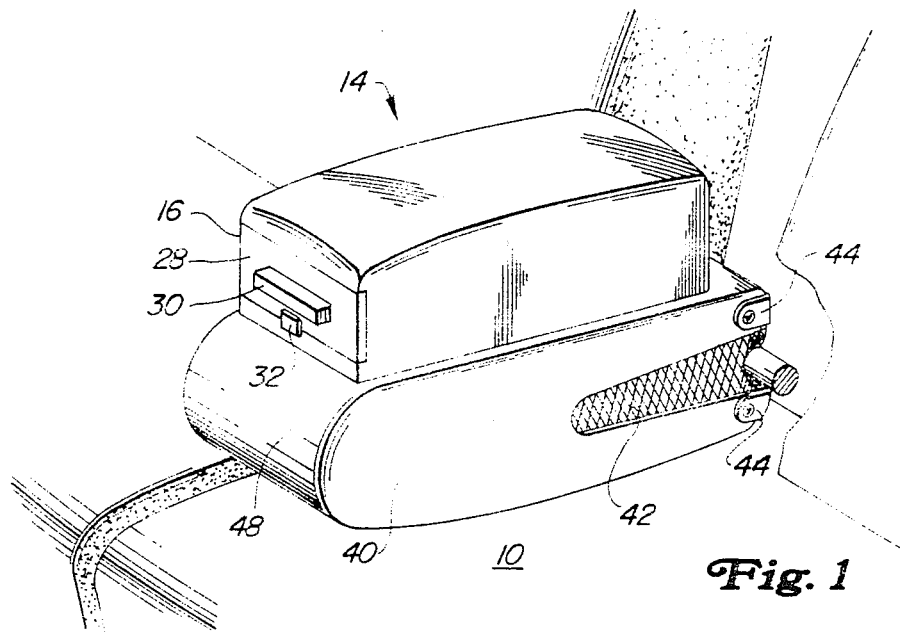
FIG. 1 is a perspective of a portion of a vehicle seat having an arm rest on which the inventive structure is mounted.
Figure 2:
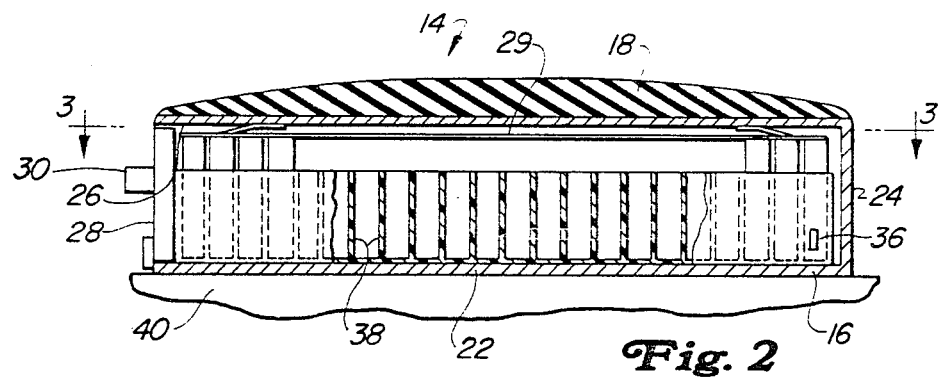
FIG. 2 is a reduced-scale longitudinal section showing the box and drawer therewithin.
Figures 3, 5:
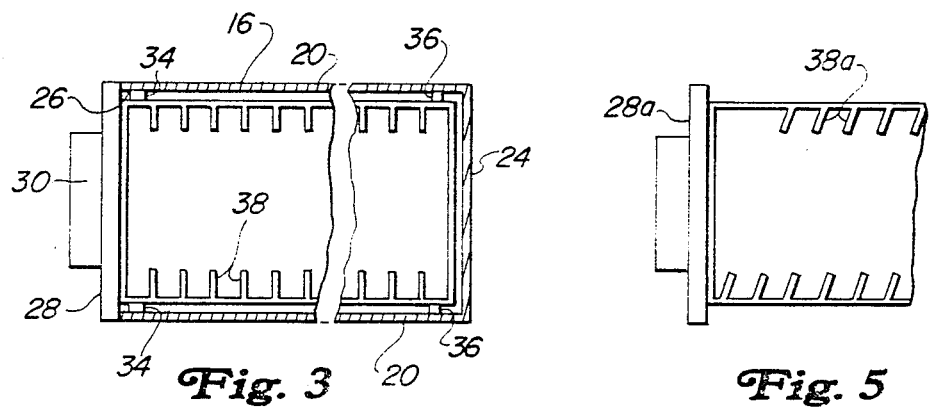
FIG. 3 is a partial section looking down on the structure, generally along the line 3—3 of FIG. 2.
FIG. 5 is a view similar to FIG. 3 but showing a different form of drawer for the attachment.
Figure 4:
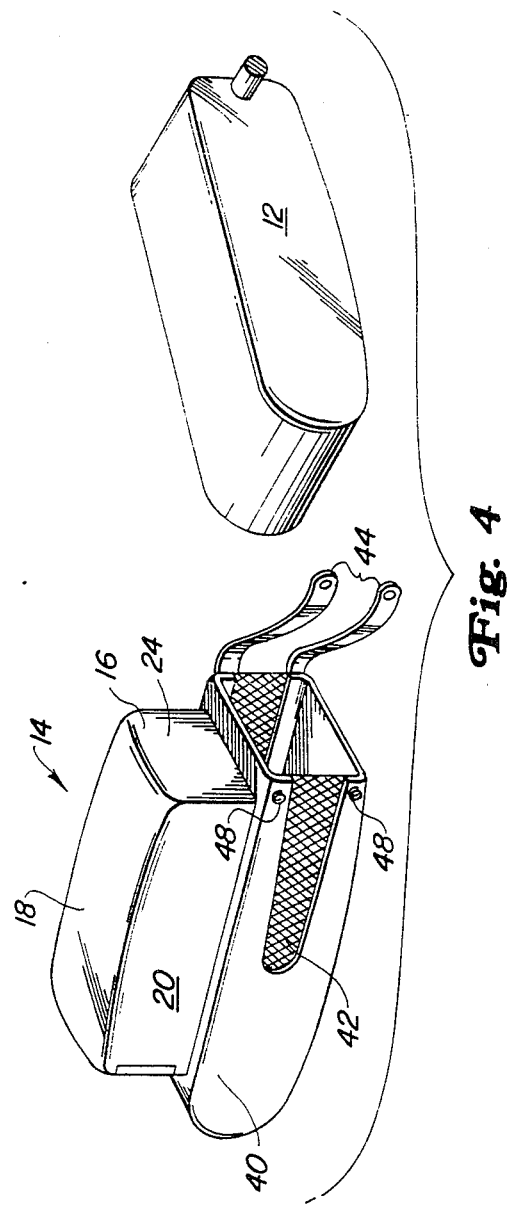
FIG. 4 is an "exploded" perspective illustrating the arm rest and the detached attachment.

Reference will be had first to FIGS. 1 and 4, wherein the numeral 10 designates a typical vehicle front seat and the numeral 12 denotes a typical arm rest (FIG. 4) conventionally provided centrally of the vehicle front seat and thus in close proximity to whatever tape, disc, etc., player (not shown) is used in the vehicle. The inventive attachment is indicated as a whole by the numeral 14 and includes a fore-and-aft elongated box-like structure 16 (hereinafter a box) having a top 18, opposite side walls 20, a bottom 22, a closed rear end 24 and an open front 26. A fore-and-aft elongated drawer 28 is received in the box 16 via the front end 26 for selective fore-and-aft sliding movement between open and closed positions. The drawer is fitted at its front end with a handle 30 for convenience in opening the drawer. Any suitable form of latch 32 may be provided for holding the drawer normally in closed position. Releasable stops 34 and 36 are provided interiorly of the structure for preventing unwanted forward escape of the drawer completely from the box. Several similar drawers may be provided, each containing a different set or group of casettes. These additional drawers may be carrier in the vehicle trunk, for example. All the drawers are completely interchangeable in the box. The drawer is formed interiorly with dividers 38 for containing tape casettes (not shown). In a modified drawer 28a (FIG. 5) the dividers 38a are arranged so as to accept discs (not shown). The top wall 18 carries at its underside a spring-loaded strip 29 for engaging the tops of the casettes to prevent them from rattling in both the up and down positions of the arm rest.

The attachment structure is held in place by sleeve-like means 40 secured to the box bottom and depending therefrom. This means (sleeve) may be of any suitable flexible material such as fabric, plastic, etc., and is dimensioned to fit the arm rest in such fashion as to be capable of being slipped over the arm rest from front to rear (See FIG. 4). Opposite sides of the sleeve may be fitted with elasticized gores 42 to enable the sleeve to more firmly grip the arm rest in order to firm up the attachment or mounting and to prevent unwanted displacement thereof. As further augmentation of the mounting, the rear or open end of the sleeve may be equipped with straps 44 that embrace the rear of the arm rest, being connected to the side of the sleeve as by snap buttons 46; although, any other type of securing means may be provided. The sleeve is closed at its front end as at 48 so as to substantially completely enclose the arm rest. The top of the box may be padded in any suitable manner to serve as an arm rest and the box may be covered with any suitable material coordinated with the sleeve material and with the decor of the vehicle interior. Since the attachment is mounted on the arm rest and the arm rest is conventionally pivoted for up and down positioning, the attachment can assume horizontal and vertical positions.

It should be recognized that the foregoing disclosure is based on a presently preferred embodiment of the invention and that, therefore, many modifications and additions may be effected without departure from the spirit and scope of the invention.

What is claimed is:

1. An attachment for mounting atop the arm rest in an automotive vehicle, comprising a box having a top, opposite side walls, a closed rear end, an open front end and a bottom adapted to rest atop the arm rest with the open front end facing forwardly, a drawer slidable fore-and-aft in the box via the open front end between open and closed positions, said drawer having upright, fore-and-aft spaced apart dividers therein providing for the downward insertion and upward removal of articles into and out of the drawer, latch means cooperative between the drawer and box for latching the drawer in closed position and means attached to the box and depending therefrom and adapted to at least in part encircle the arm rest so as to fixedly mount the box on the arm rest.

2. The attachment of claim 1, including stop means cooperative between the box and drawer for preventing unwanted complete forward separation of the drawer from the box.

3. The attachment of claim 1, including a fore-and-aft bar disposed at the underside of the top of the box and biasing means cooperative between the bar and the top of the box for urging the bar downwardly into contact with articles in the drawer.

4. The attachment of claim 1, in which means for mounting the box on the arm rest includes a fore-and-aft sleeve depending from the box and configured to slip rearwardly over the arm rest.

5. The attachment of claim 4, in which the sleeve includes elastic portions providing a relatively tight fit between the sleeve and arm rest.

6. The attachment of claim 4, in which the sleeve is closed at its front end.

7. The attachment of claim 4, including means at the rear of the sleeve for embracing the rear end of the arm rest.

* * * * *